Jan. 28, 1941.  R. B. P. CRAWFORD  2,230,157
AIR CONDITIONING SYSTEM
Original Filed July 5, 1929  3 Sheets-Sheet 2
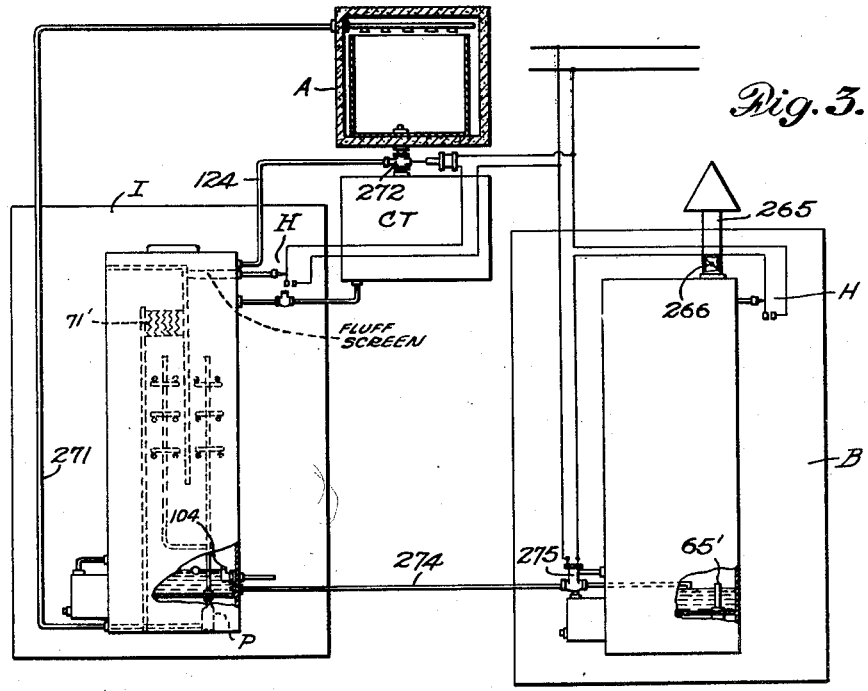
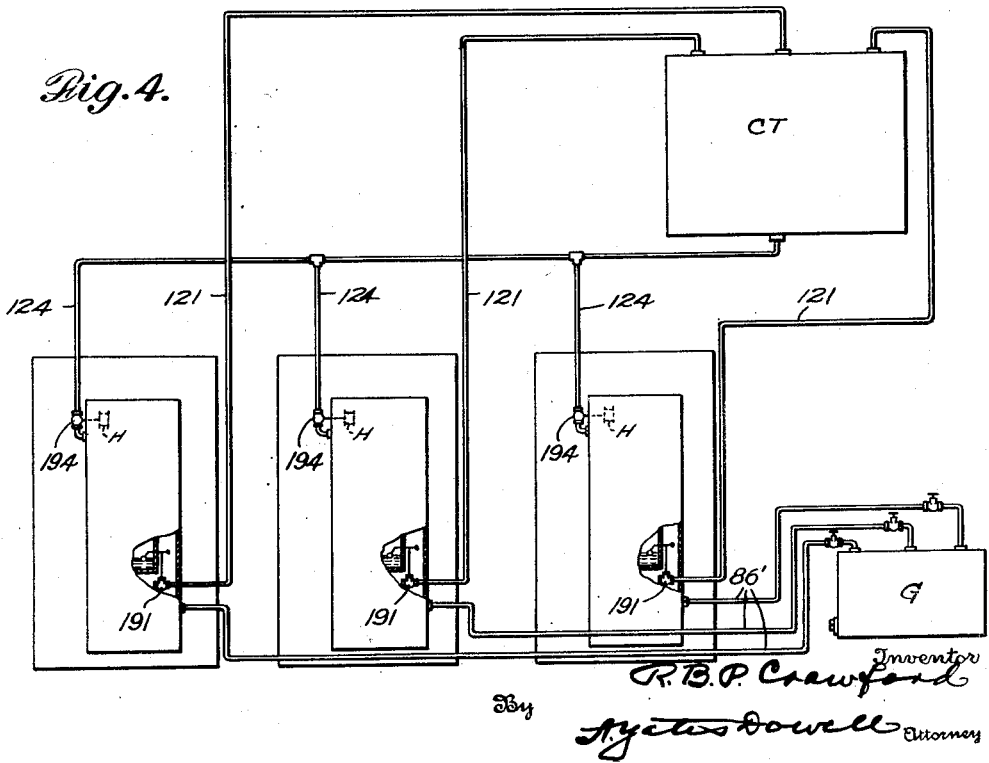

Patented Jan. 28, 1941

2,230,157

UNITED STATES PATENT OFFICE 2,230,157

AIR CONDITIONING SYSTEM

Robert B. P. Crawford, Washington, D. C., assignor to Frick Company, Waynesboro, Pa., a corporation of Pennsylvania Original application July 5, 1929, Serial No. 375,952. Divided and this application July 17, 1937, Serial No. 154,314

11 Claims. (Cl. 237—3)

This invention relates to air-conditioning and more particularly air-conditioning wherein a plurality of conditioning chambers are employed for conditioning the air with regard to both temperature and humidity within one or more enclosures and is a division of my co-pending application No. 375,952, filed July 5, 1929, which has matured as Patent Number 2,137,996. The invention contemplates, generally, heat exchange between conditioning chambers used to condition the air of enclosures having different temperature and humidity conditions, but may also be employed to exchange heat between several conditioners applied to the same enclosure.

The invention further contemplates the provision of communicating passages between conditioners with suitable temperature and humidity controls for exchanging heat between two or more conditioners by means of fluid conduits with proper flow controls.

It is an object of the invention to provide an improved construction and arrangement of elements in order to efficiently, economically and satisfactorily obtain desired conditions of temperature and humidity.

Another object of the invention is to provide a construction capable of maintaining a lower temperature and a higher relative humidity, but a lower absolute humidity in one enclosure as for example the brooding enclosure than in another enclosure, as for example the incubating enclosure and to provide a novel relation of cross connecting two enclosures whereby desired conditions are maintained in both with the maximum conservation of heat energy, etc.

Other objects and the nature and advantages of the invention will be apparent from the following description taken in conjunction with the accompanying drawings, wherein:

Figure 3 is a diagrammatic view of a further modification employing an aerating chamber and a cooling tower in connection with one of the chambers.

Figure 4 is a further modification in which a series of three conditioners are used with a single cooling tower and with ozonator.

Figure 6:
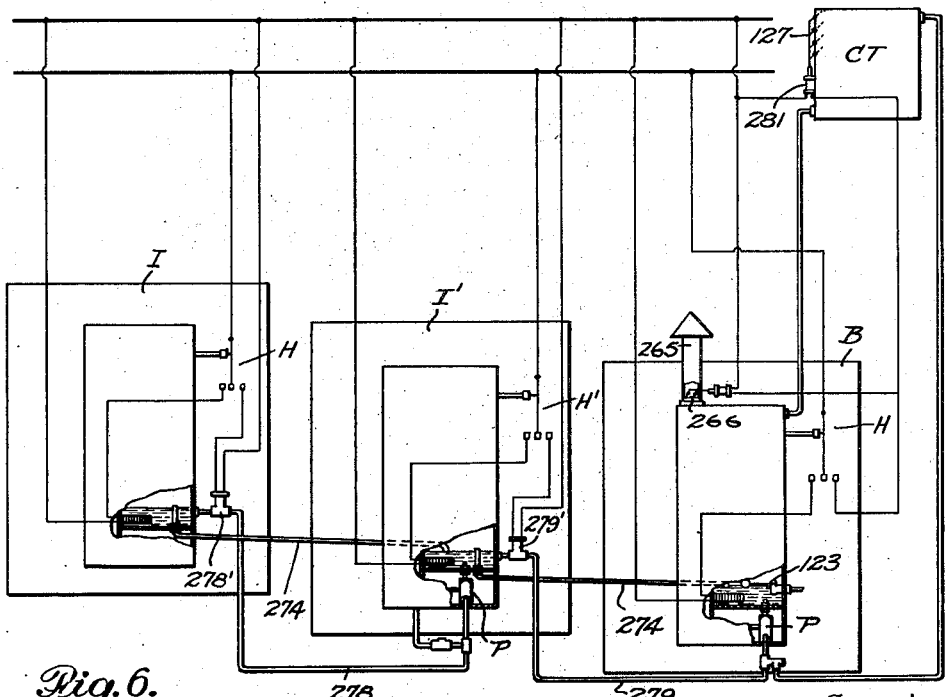

Figure 6 a similar view of a still further modification.

Figure 1:
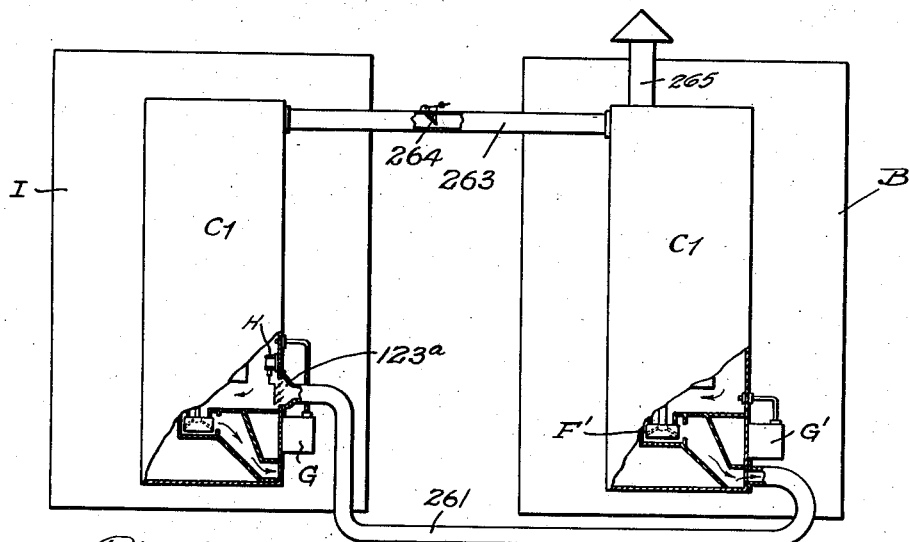
Figure 1 is a diagrammatic view with parts broken away illustrating one application of the invention.

Referring to Figure 1, the incubating enclosure I and the brooding enclosure B are both illustrated as being provided with conditioning units CI of the construction shown either in Figures 5, 6, 7 or 8, of my copending application Serial No. 375,952 of which this application is a division. As the specific form of these conditioning units forms no part of the present invention they are not described in detail here. In the case of the conditioning unit CI for the brooder, the dry bulb thermostat thereof will be set to maintain a lower temperature within the brooder than is maintained in the incubator, and the dew point sensing instrument, hygrostat or the like, will be set to maintain a higher humidity in the brooder than in the incubator. Connecting the two conditioning units is a conduit 261.

This conduit is intended to supply cooler air from the brooder system to the incubator system and accordingly at the brooder the duct is connected in the system on the discharge side of the fan or blower F' and at the incubator end is connected to the system at the intake side of the fan or blower, whereby the pressure differential between the discharge and intake sides of the two blowers is utilized for compelling air flow through the conduit 261.

Controlling the flow through said conduit is a damper device 123a which is operatively connected to be responsive to the dry bulb temperature, or the humidity, or both, in the incubator. For example, such damper may be controlled by the dry bulb thermostat T in the incubator whereby a rise in the air temperature therein above a predetermined value will operate to admit some of the relatively cooler air from the brooder. As alternative arrangements, the damper 123a may be controlled by a dew point sensing instrument H or other humidity responsive device so that with a rise in humidity, cool air at a lower absolute humidity will be admitted from the brooder; or such damper may be controlled through a relay not shown, which relay in turn may be responsive both to a dry bulb thermostat and a humidity responsive device so that this cool air will be admitted to the incubator either with an abnormal rise in temperature or humidity. In the latter arrangement, which is preferred, it will be noted that this damper 123a functions analogously to the water valve 123 of Figure 6 in my copending application 375,952. As the damper 123a may be controlled by the dry bulb thermostat T or the humidity responsive device H, it may be said that the damper is controlled in response to psychrometric condition and it is to be understood that when the term "psychrometric" is used that it is generic and covers both temperature and humidity or both of these conditions.

It will be noted that in each of the above described arrangements the brooder system constitutes a source of low temperature or cold, thereby taking the place of the cooling tower C T in so far as maintaining proper conditions in the incubator is concerned. Another conduit 263 may be extended between the incubating and brooding enclosures, or between the upper inlet portions of the two conditioning units C1 and C1. Interposed in such conduit is a weighted back damper 264 which is normally closed. This conduit and back damper prevents the possibility of an excessive air pressure building up in the incubator. The incubator and brooder may be supplied with ozone from a common ozone generating machine, or separate generating devices G and G' may be employed as illustrated. An inhibiting concentration will generally be supplied to the brooder.

In some instances it may be desirable to associate the two conditioning devices C1 and C2 with the incubator, or to associate only the conditioning unit C2 therewith, the latter practice being made possible by virtue of the cross connection with the brooder.

Figure 2:
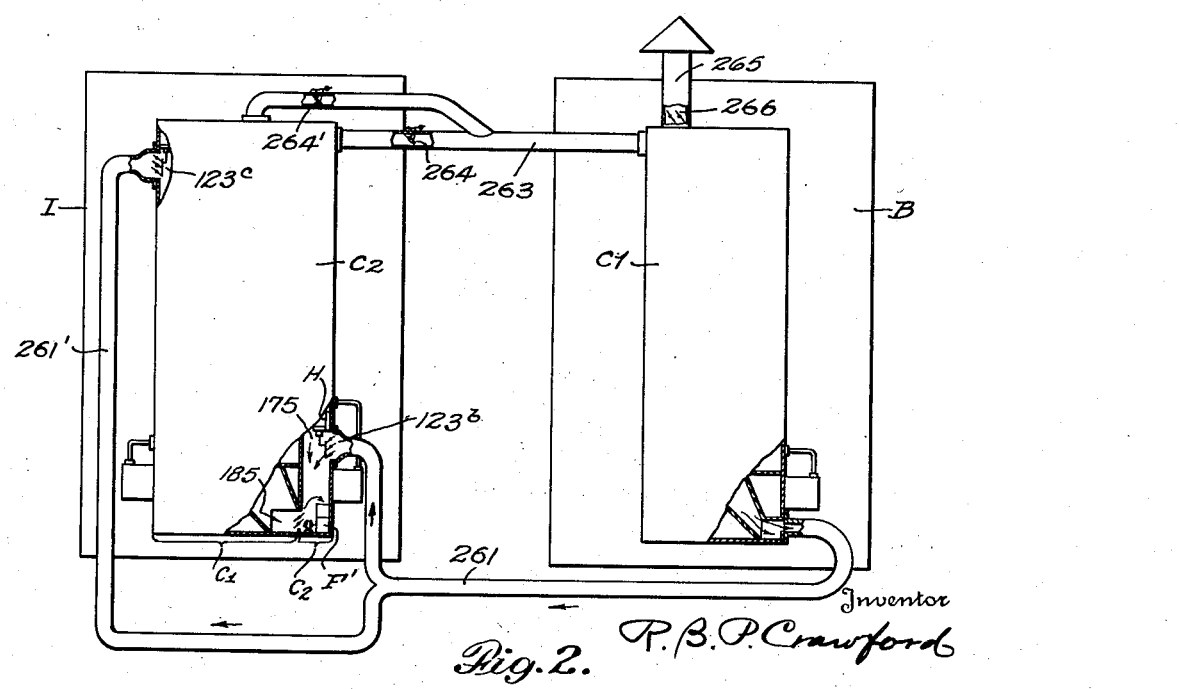
Figure 2 is a diagrammatic view of parts broken away of another application of the invention.

In Figure 2 I have illustrated this arrangement. The conditioning unit C2 can be regarded in one practice as conditioning all of the air circulated through the incubator, or can be regarded in another practice as operating in conjunction with the conditioning unit C1, with the latter conditioning the air circulating through the hatching compartment, as previously described.

In either of these instances, the conduit 261 is preferably connected with the passageway 175 of the conditioning unit C2, such point of connection being preferable although not essential, since the induced draft created by the blower F' then stimulates circulation through the conduit 261. A damper 123b in the conduit 261 is preferably connected to respond to a dew point sensing instrument H or a hygrostat or other like device whereby said damper will be opened when the humidity either in the incubating or hatching compartment, depending upon which practice is followed, rises above a predetermined value. When the two conditioning units C1 and C2 are both employed in conjunction with the hatching and incubating enclosures, the louvre damper 185 connecting these two units will be placed under the control of a dew point instrument, hygrostat or the like so that said louvre will be opened when the dew point in the incubating compartment falls below a predetermined value. In such arrangement, employing both conditioning units C1 and C2, the conduit 261 is also provided with a branch 261' communicating with the unit C2, preferably adjacent to the air outlet end of said unit. Regulating the air flow through this branch is a damper 123c which is controlled automatically by a dew point instrument or other device H for sensing the humidity within the hatching compartment so that when this humidity rises above a desired value the damper 123c will be opened for admitting the cooler air from the brooder. As shown in the embodiment of Figure 2, the upper cross conduit 263 may be provided with separate branches leading to the two conditioning units C1 and C2 or leading separately to the incubating and hatching compartments and interposed in these separate branches are normally closed, weighted back dampers 264 and 264'. If desired, a fresh air intake 265 may be provided for the brooder, corresponding to standard air conditioning practice, and a damper 266 in this intake is preferably automatically controlled by dew point sensings in the brooder to open and admit fresh air when such dew point rises above a predetermined value.

The invention also contemplates the transference of heat energy between the incubator and brooder by an arrangement wherein the spray water is utilized as the heat conducting medium. By virtue of the fact that the dry bulb temperature in the incubator is higher than in the brooder, the spray water in the conditioning unit of the incubator will generally be higher in temperature than the spray water in the conditioning unit of the brooder. Figure 3 diagrammatically illustrates an arrangement wherein this higher temperature spray water in the conditioning unit of the incubator is transferred to the conditioning unit of the brooder for controlling humidity or temperature conditions in the brooder. The arrangement of the conditioning apparatus for the incubator I may be substantially a duplication of that disclosed in Figure 6, of my copending application Serial No. 375,952 or any other of the conditioning units or arrangements thereof described therein may be employed. The spray water is circulated by the pump P up through pipe 271 to the aerator A. The return water from this aerator passes through a three-way valve 272 which, in its normal position, directs this return water through a pipe 124 leading back to the conditioning units and discharging over the baffles and fluff screens substantially as described of Figure 6 of my copending application Serial No. 375,952. Such valve in its other position closes admission to the pipe 124 and directs all of the water from the aerator A to the cooling tower CT, the general construction of such three-way valve being old and well known.

Said valve is automatically controlled by humidity control means H utilizing either a dew point sensing instrument, a hygrostat, or the like, substantially as previously described, such humidity control responding to humidity conditions in the incubator I. Normally the spray water does not pass through the cooling tower, but when the humidity rises the valve 272 is operated to direct the spray water through the cooling tower for lowering the temperature of said water. The valve is preferably electromagnetically operated as described of the other control valves, although it may be pneumatically or mechanically operated if desired. The spray water returned from the cooling tower CT is likewise sprayed over the baffle 71' and over the fluff screens.

Extending from the spray water tank of the incubator conditioning unit is a pipe 274 which discharges into the spray water tank of the conditioning unit associated with the brooder B, the levels of the two tanks being preferably such that flow normally tends to occur from the incubator unit to the brooder unit. Interposed in said pipe is a control valve 275 which is responsive to humidity control means H associated with the brooder B. This valve may also be controlled either electrically or mechanically in response to the dew point sensing instrument, a hygrostat or the like, arranged to sense humidity conditions in the brooder, the operating arrangement being such that when the dew point in the brooder lowers below its desired value, the valve 275 is opened for admitting some of the higher temperature spray water from the incubating unit to the brooder unit.

When the humidity in the brooder rises above its desired value, the humidity control means H may be arranged automatically to open the damper 266 in the fresh air inlet 265. Water is supplied to the system through a float controlled valve 194 responsive to the level in the spray tank of the incubator unit. Hence, as water is supplied from the incubator unit to the brooding unit, the replenishing supply of water enters the incubator end of the series. When the water level in the spray tank of the brooder unit rises above a predetermined level, through transference of heated water thereto from the incubator unit, overflow occurs through the overflow pipe 65'. The thermal units in the transferred water enable the humidity, or temperature, in the brooder unit to be held up to the desired value without the necessity of a source of heat, and consequently conserves operating energy for the combination.

Figure 4 illustrates how a single cooling tower CT may be arranged to serve a plurality of enclosures, whether the latter be incubating, hatching or brooding enclosures. In such arrangement, the cooling tower is of relatively large storage capacity, and the warm water from the conditioning units of all of the enclosures is conducted through the pipes 121 up to the spray nozzles of the tower. The cooled water is returned from the storage reservoir of the tower through the return pipes 124 to the individual conditioning units.

The pumped circulation of the spray water from each conditioning unit up to the cooling tower may be governed by a float controlled valve 191 substantially as described of the operating arrangement illustrated in Figure 7 of my copending application Serial No. 375,952, but which, specifically, forms no part of the present invention. The return feed to each conditioning unit may be governed by a control valve 194 responding to humidity or temperature requirements in the particular enclosure under the regulating action of appropriate control means, such as the humidity control means H, also as illustrated in Figure 7 of my copending application Serial No. 375,952, but which, specifically, forms no part of the present invention. Thus, all of the conditioning units can draw from this common source of relatively cool water in accordance with their individual requirements. Figure 4 also illustrates how a single germicidal device G may be connected for supplying ozone, formaldehyde, or other germicidal agent to a plurality of enclosures, the degree of concentration conducted through the pipes 86' being adjusted for the requirements of each enclosure.

Figure 5:
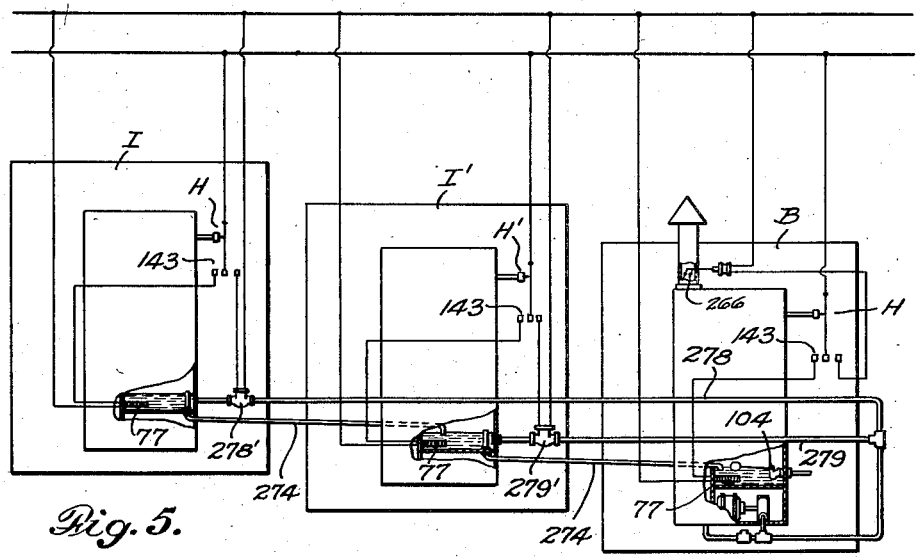
Figure 5 is a similar view of a further modified construction.

Figure 5 illustrates another arrangement wherein spray water is conducted from unit to unit for transferring thermal energy between the units in the maintenance of the proper conditioning requirements in each of the units. In the arrangement of the three units I, I' and B, an overflow pipe 274 conducts water from the spray tank of the unit I to the spray tank of the unit I', and a similar overflow pipe conducts overflow water from the latter tank to the tank of the unit B. The pump discharge from the conditioning unit of the brooder B communicates with two pipes 278 and 279, the former leading back to the conditioning unit of the incubator I and the latter leading back to the conditioning unit of the hatching enclosure I'.

Interposed in each of these pipes is a control valve 278' and 279', respectively, such valves being electromagnetically operated and being subject to the control of dew point or humidity control means H and H' associated with the incubating and hatching units I and I'. When the dew point in the incubating enclosure rises, the valve 278' is opened to permit flow of water through the pipe 278 to the conditioning unit of this enclosure. Similarly, when the dew point in the hatching enclosure I' rises, the valve 279' opens and permits water to flow through the pipe 279 to the conditioning unit of the hatching enclosure. Associated with the spray tank of each conditioning unit is an electric water heater 77. The switch 143 comprising part of the humidity control means associated with each unit has one contact connected to control the valve 278' or 279' associated with that unit, and has its other contact connected with the electric heater 77 in the spray water tank. Under normal operating conditions, the spray water in the incubating unit will be higher in temperature than the spray water in the hatching unit, and the temperature of the spray water in the hatching unit will be higher than that of the spray water in the brooder unit. Assume now that the dew point in the incubator unit should rise above its desired value, the control means H will respond to energize the valve 278' and permit some of the lower temperature spray water to be circulated from the brooder unit through the pipe 278 to the incubating unit.

The admission of this lower temperature spray water will operate to lower the dew point in the incubator unit. Any overflow from the spray tank of the incubator unit will pass through the first overflow pipe 274 to the tank of the hatching unit I'. If, on the other hand, the humidity in the incubating unit should fall below its desired value, the control means H will respond to energize the electric heater 77 and raise the temperature of the spray water, thereby raising the dew point of the conditioned air. The same operating relation is true of the hatching unit I'. A raising of the dew point operates through the control means H' to open the valve 279' for permitting the inflow of the lower temperature spray water from the brooder unit to the hatching unit, and conversely, a lowering of the dew point operates through this same control means to energize the electric heating element 77. It will be understood that the conditioning unit associated with each of the enclosures I and I' has a complete spray water circuit substantially as desired of the preceding embodiments, the same not being shown because of the previous description thereof. The admission of relatively cooler spray water from the brooder unit to the incubating and hatching units takes the place of the cooling tower in the spray water circuits of each of these units. The spray water circuit for the conditioning unit of the brooder B may be confined entirely within the conditioning unit or such circuit may include a cooling tower if the situation requires lowering of the temperature of the brooder spray water.

The humidity control means H associated with the brooder operates to energize the electric heater 77 when the dew point should be raised, and operates to energize the electromagnet actuating means for the fresh air damper 266 in order to open this damper when the dew point should be lowered. The pipes 278 and 279 are so connected in the spray water circuit of the brooder unit that a static water pressure is constantly maintained in the pipes 278 and 279 so that the lower temperature water is instantly supplied to the other units upon the opening of the valves 278' and 279'. A spring pressure valve may be suitably interposed in the spray water circuit of the brooder unit for maintaining this static pressure in the pipes 278 and 279. I have not described in detail all of the wires making up the different control circuits, since they will be obvious from the drawings and from the preceding description. Water is supplied to the entire combination through a float controlled inlet valve 104 in the spray water tank of the brooder unit, which valve maintains a substantially constant level of water in said tank. A suitable overflow drain may be provided in the tank to limit the maximum level of the water therein.

Figure 6 illustrates another arrangement generally similar to Figure 5, differing therefrom principally in the fact that the cooler spray water conducted to the conditioning unit of the incubator I is supplied from the conditioning unit of the hatching enclosure I' rather than from the conditioning unit of the brooder.

The cooler spray water supplied to the intermediate hatching unit I' is obtained from the conditioning unit of the brooder in the same manner as described of Figure 5. In the modified arrangement of Figure 6, the pipe 278 extends from the pump of the hatching unit I' so that the lower temperature spray water supplied to the incubating unit is drawn directly from the hatching unit. The other pipe 279 extends from the pump of the brooding unit to the spray water tank of the hatching unit, as described of Figure 5. The three spray water tanks are connected by the overflow pipes 274, 274, flow through the pipes 278 and 279 being governed by the automatic valves 278' and 279' in the same manner as above described. In this modified arrangement, I have shown the spray water for the brooder unit as being circulated through a cooling tower CT, for lowering the dew point in the brooder, although it will be understood that refrigeration, the admission of fresh air or the admission of relatively cool well water may be employed to lower the dew point. In the arrangement illustrated, I have shown the humidity control means H as operating to admit fresh air through the damper 266 and as operating to open the shutter 127 of the cooling tower, through the instrumentality of the electromagnet 281, when it is necessary to lower the dew point in the brooder.

It will be obvious to those skilled in the art that various changes may be made in this device without departing from the spirit of the invention and therefore the invention is not limited to what is shown in the drawings and described in the specification but only as indicated in the appended claims.

I claim:

1. In a brooding and incubating arrangement, a brooding system and an incubating system, each system including an enclosure and a conditioner therefor, each of said conditioners including a water diffusing means, an aerator, means for passing water from the water diffusing means of one of the systems to the aerator, means for passing water from the aerator back to the said system, and means for providing fluid interflow between said brooding system and said incubating system to affect the psychrometric condition of one of said systems, whereby both of said systems will cooperate with each other to effect a relatively high thermal efficiency.

2. In a brooding and incubating arrangement, a brooding system and an incubating system, each system including an enclosure and a conditioner therefor, each of said conditioners including a water diffusing means, a cooling tower, means for passing water from the water diffusing means of one of the systems to the cooling tower, and means for passing water from the cooling tower back to said system, and means for providing fluid interflow between said brooding system and said incubating system to affect the psychrometric condition of one of said systems, whereby both of said systems will cooperate with each other to effect a relatively high thermal efficiency.

3. The apparatus recited in claim 1 and a cooling tower, means for conducting water from the aerator to the cooling tower, and means for conducting water from the cooling tower back to one of said systems.

4. The method of maintaining predetermined temperature and humidity conditions within one enclosure and predetermined different temperature and humidity conditions within a second enclosure comprising circulating the air of said first enclosure to and from psychrometric affecting means, conditioning the air of said second enclosure to a degree different from that maintained in said first enclosure by circulating the air within said second enclosure to and from a second psychrometric affecting means, transferring heat from one psychrometric affecting means to the second psychrometric affecting means, whereby desired conditions within the system will be economically effected.

5. The method of maintaining predetermined temperature and humidity conditions within one enclosure and predetermined different temperature and humidity conditions within a second enclosure comprising conditioning the air of said first enclosure by psychrometric affecting means, conditioning the air of said second enclosure to a degree different from that maintained in said first enclosure by circulating the air within said second enclosure to and from a second psychrometric affecting means, transferring moisture from one psychrometric affecting means to the second psychrometric affecting means, whereby desired conditions within the system will be economically effected.

6. The method of maintaining predetermined temperature and humidity conditions within one enclosure and predetermined different temperature and humidity conditions within a second enclosure comprising conditioning the air of said first enclosure by psychrometric affecting means, conditioning the air of said second enclosure to a degree different from that maintained in said first enclosure by circulating the air within said second enclosure to and from a second psychrometric affecting means, transferring heat and moisture from one psychrometric affecting means to the second psychrometric affecting means, whereby desired conditions within the system will be economically effected.

7. In a brooding and incubating arrangement, a brooding enclosure, an incubating enclosure, an air conditioning unit for each enclosure respectively, means for controlling the conditioning units to effect a lower temperature within the brooding enclosure than within the incubating enclosure, and conduit means connecting the conditioner for the brooding enclosure with the conditioner for the incubating enclosure, said structure and arrangement being such as to effect fluid flow between the brooding enclosure and the incubating enclosure, flow control means within said conduit, and means responsive to psychrometric conditions within the incubating enclosure for actuating said flow controlling means.

8. In a conditioning apparatus including a plurality of systems, each of said systems including an enclosure and an air conditioner therefor including means for effecting psychrometric conditions, means for effecting passage of air from each enclosure to its corresponding conditioner and back to the enclosure, means for supplying relatively cool water to a first of said conditioners, means for supplying water from this first conditioner to a second conditioner, and means for controlling the flow of water from the first said conditioner to the said second conditioner in accordance with the psychrometric conditions within one of said systems.

9. In an incubating, hatching, and brooding arrangement, an incubating enclosure, a hatching enclosure, and a brooding enclosure, an air conditioning unit for each enclosure respectively, means for controlling the conditioners to effect a lower temperature within the brooder enclosure than within the incubating and hatching enclosures, conduit means connecting the conditioner for the brooding enclosure with the conditioner for the incubating enclosure, a fluid within said conduit, fluid moving means arranged to stimulate circulation through said conduit from the conditioner for the brooding enclosure to the conditioner for the incubating enclosure, whereby the arrangement involves cooperation of the elements thereof to effect a relatively high thermal efficiency.

10. The method of maintaining, by utilizing a first and second psychrometric affecting means, a predetermined relatively high temperature and relatively low relative humidity within a first enclosure and predetermined relatively low temperature and relatively high relative humidity within a second enclosure comprising: circulating air from said first enclosure to and from a first psychrometric affecting means, circulating air from said second enclosure to and from a second psychrometric affecting means, passing air between said two psychrometric affecting means, and controlling the said passing of air in accordance with a psychrometric condition of the air from one of said enclosures.

11. The method recited in claim 10, passing air from said second psychrometric affecting means to said first psychrometric affecting means, and controlling the flow from said second psychrometric affecting means to said first psychrometric means in accordance with a psychrometric condition of the air from said first enclosure.

ROBERT B. P. CRAWFORD.